Figure 1:
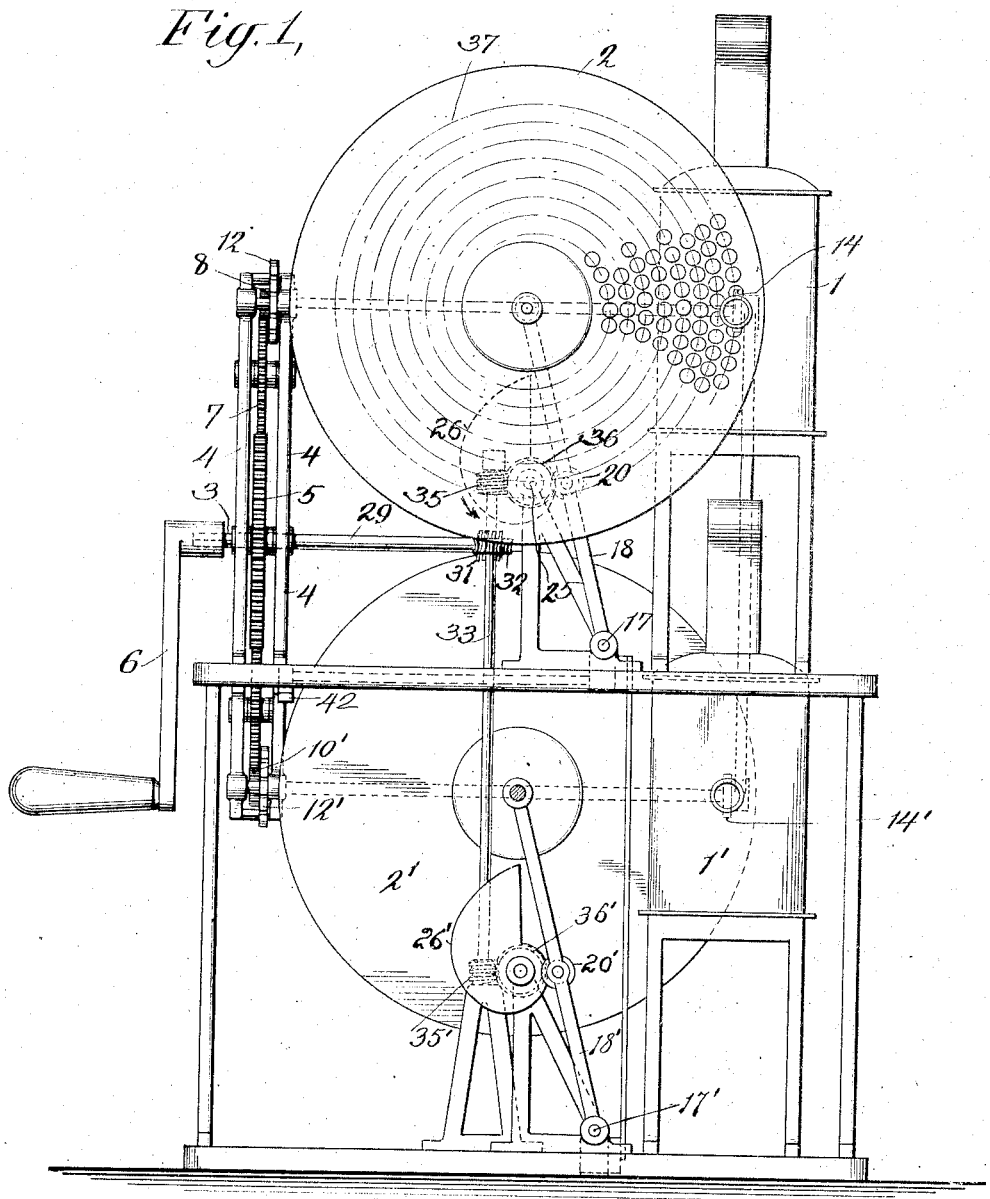

No. 814,662. PATENTED MAR. 13, 1906.
W. H. BAKER.
KINEMATOGRAPH.
APPLICATION FILED FEB. 6, 1904.

3 SHEETS—SHEET 1.

WITNESSES:
Andrew M Smith
Otto P. Osmers

INVENTOR
William H Baker
BY Charles S Jones
His ATTORNEY

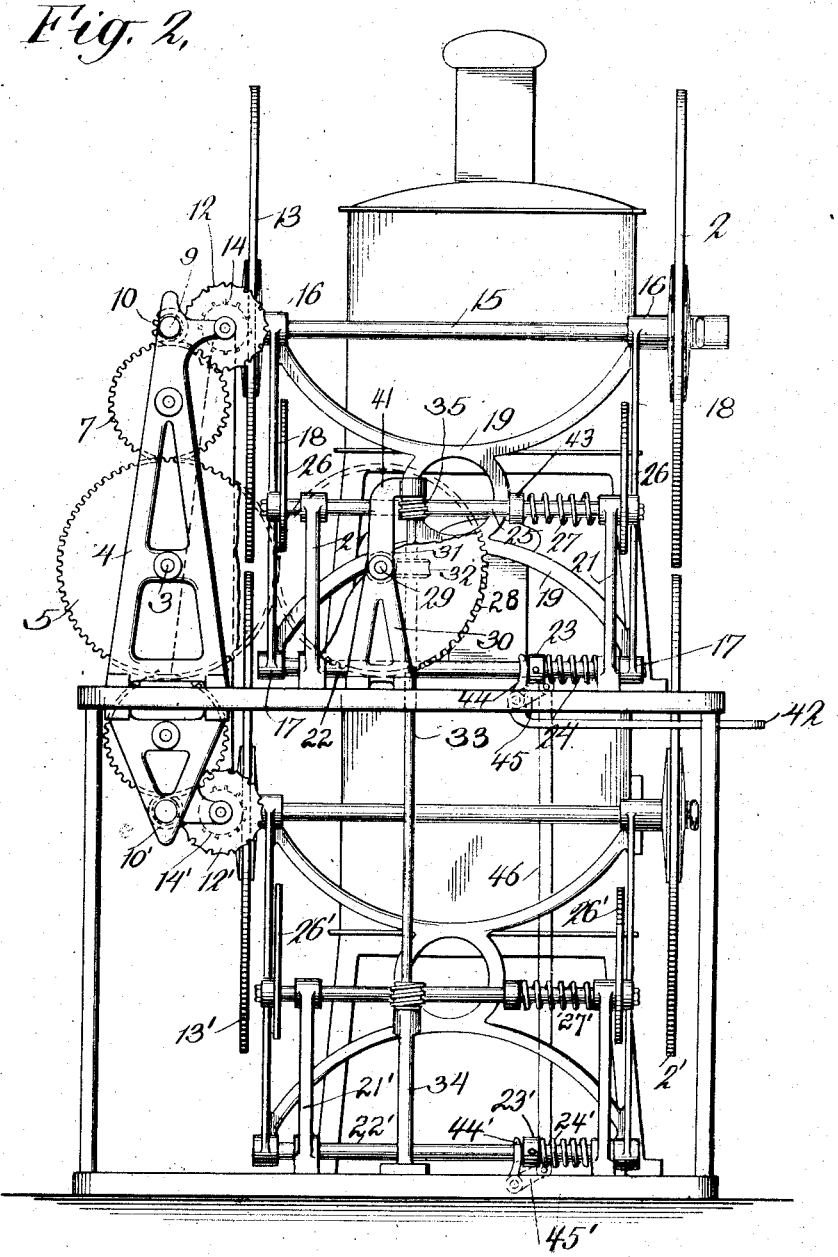

No. 814,662. PATENTED MAR. 13, 1906.
W. H. BAKER.
KINEMATOGRAPH.
APPLICATION FILED FEB. 6, 1904.
3 SHEETS—SHEET 3.
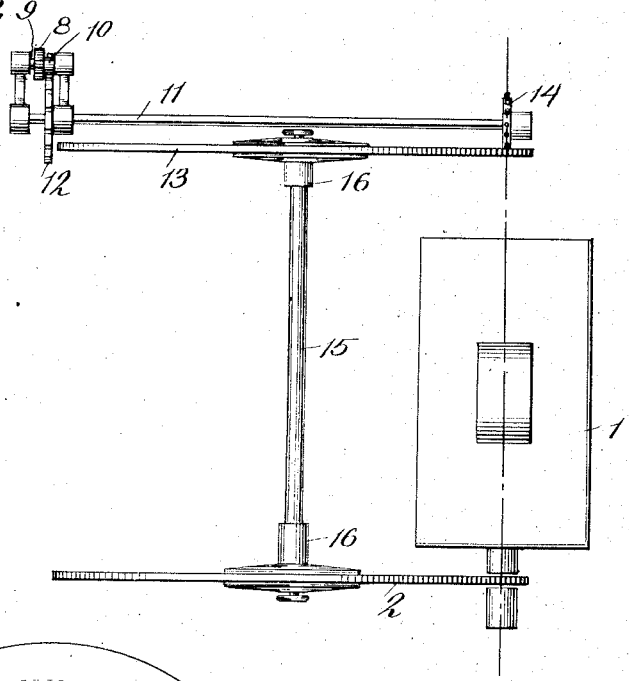
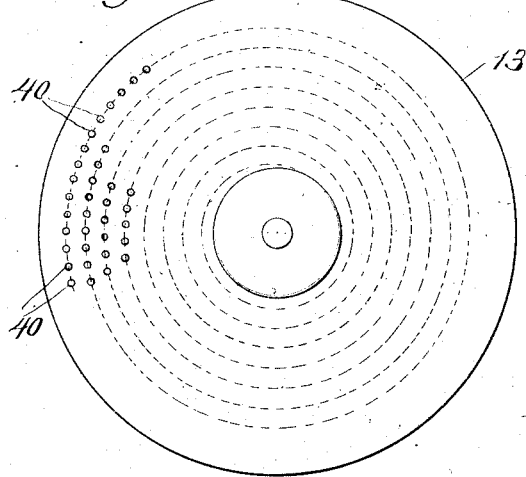
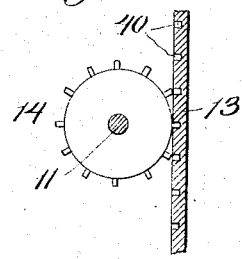
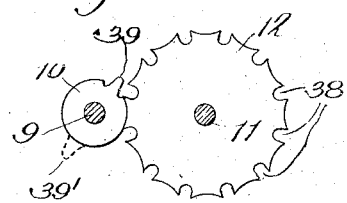
WITNESSES:
Andrew M Smith
Otto R Osmers
INVENTOR
William H Baker
BY
Charles S Jones
his ATTORNEY

UNITED STATES PATENT OFFICE.

WILLIAM H. BAKER, OF CENTRAL FALLS, RHODE ISLAND.

KINEMATOGRAPH.

No. 814,662.  Specification of Letters Patent.  Patented March 13, 1906.

Application filed February 6, 1904. Serial No. 192,311.

*To all whom it may concern:*

Be it known that I, WILLIAM H. BAKER, a citizen of the United States, and a resident of Central Falls, Providence county, State of Rhode Island, have invented certain new and useful Improvements in Kinematographs, of which the following is a specification.

My invention relates to kinematographs or similar apparatus for exhibiting pictures in which the impression is given to the eye of objects in motion.

In carrying my invention into effect the pictures are arranged in a spiral or helical path upon a glass or other suitable disk and the disk rotated intermittently in front of a lantern-lens and at the same time moved laterally in such manner that as the helical line of pictures passes the lens the disk will be moved laterally an amount corresponding to the breadth of the helical line for each complete revolution of the disk. Consequently the pictures in succession will be presented for projection upon a suitable screen until the whole series is seen, after which the mechanism may be returned to the original position for a repetition of the described movements.

In the following specification I have described my invention as employed in connection with a lantern to project the pictures upon a screen; but it is to be understood that the invention is equally applicable to apparatus for viewing directly by the eye a series of photographic or other pictures.

It is also to be understood that the invention may be employed to intermittently rotate and advance a sensitized plate or disk in front of a photographic lens in order that the series of photographs may be produced in a spiral path on said disk.

My invention further contemplates a duplex apparatus employing two disks and two lanterns, the relation between the two being such that each projects a series of pictures onto a common screen, a constant and uninterrupted amount of light being maintained on the screen on which the pictures are projected.

The invention will be understood by reference to the accompanying drawings, in which—

Figure 1 is a front elevation, and Fig. 2 a side elevation, of one embodiment of my invention. Fig. 3 is a top view of the driving mechanism. Fig. 4 is a rear view of the driving-disk. Fig. 5 is a detail sectional view of the driving wheel and disk, and Fig. 6 is a detail of the stop motion.

Similar numerals indicate similar parts in the several views.

As above stated, my invention contemplates the adoption of two combined apparatus, one being a counterpart of the other. I shall therefore first describe one set of mechanisms and afterward describe how the two are combined and adapted to coact with each other.

Referring to the drawings, the numeral 1 designates a lantern or projecting instrument of any suitable or well-known type, and 2 a picture-disk adapted to be rotated and advanced in front of the lens thereof. The pictures upon this disk consist of photographically-produced positives, each picture being about one-quarter of an inch in diameter with a black or opaque ground—that is, all the space on the plate except that occupied by the pictures themselves will be black or opaque.

The pictures, which are upon any suitable transparent mounting, as glass, or, if of celluloid, it is clamped between suitable plates, are arranged in a spiral or helical path, as indicated by the broken line 37 in Fig. 1, a few of the pictures being indicated by circles. By assembling the pictures in this manner a very large number may be contained in a small compass, overcoming many objections incident to the generally used continuous films, and particularly in that a greater number of pictures may be exposed per unit of time than is practically possible with a film, thus giving a better-defined and more lifelike impression upon the eye. The desired movements of the picture-disk are obtained through the following instrumentalities: 3 designates a shaft mounted in bearings in the side frames 4 4. Said shaft carries the driving-gear 5 and may be rotated by any suitable form of motor or manually by means of the handle 6. The driving-gear 5 meshes with an intermediate gear 7, and the latter in turn meshes with a pinion 8, which is mounted on a shaft 9, having bearings in the side frames 4 4, and which shaft carries a single-toothed pinion 10, constituting one member of a well-known form of stop-motion. Mounted on a shaft 11, which is parallel with the shaft 9, is the second member 12 of the stop-motion. The member 12 is in the form of a wheel provided with radial recesses 38 in the periphery thereof, Fig. 6, adapted to be engaged by the tooth 39 of the pinion 10 to impart to said wheel an intermittent rotary motion. The shaft 11 extends across the center of a disk 13 and carries at its other end a toothed wheel 14, having as many teeth thereon as there are notches or recesses in the wheel 12 of the stop-motion. The disk 13, which is preferably of metal, is perforated or recessed, as shown at 40 in Figs. 4 and 5, the perforations or recesses being arranged in a spiral path and corresponding in position and number to the pictures on the disk 2. The toothed wheel 14 is on the optical axis of the lantern or projecting instrument 1, and said disk 13 is intermittently rotated by said toothed wheel engaging successive perforations or recesses 40 when said wheel is intermittently rotated through the train of gearing above described. The motion of the disk 13 is transmitted to the picture-disk 2 through a shaft 15, on which both disks are mounted. Said shaft 15 is mounted in bearings 16 16, which form part of a swinging frame comprising side arms 18 18, connected by a web 19. Said side arms are pivotally mounted at 17 17 on a shaft 22, set in bearings in upright frames 21 21. The shaft 22, on which the swinging frame is mounted, carries a collar 23 and spring 24, which tends to hold the disk 13 up against its driving-wheel 14.

Not only must a rotary motion be imparted to the picture-disk 2, but said disk must be advanced laterally. This latter movement is effected by the following means: Pivotally mounted midway of the length of the side arms 18 18 of the swinging frame are cam-rollers 20, and in the upright frames 21 21 is supported a shaft 25, which carries two constant-progression cams 26 26, one at each end, which cams bear against the rollers 20. The shaft 25 carries a collar 43 and spring 27, the latter fixed at one end to the bearing and the other to said collar, to return the cams 26 26 to their initial position, as hereinafter described.

Meshing with the driving-gear 5 is a gear 28, Fig. 2, mounted on a shaft 29, carried by a fixed frame 30. A worm 31 is carried by the shaft 29, so as to be rotated thereby, and said worm meshes with a worm-wheel 32, mounted on a vertical shaft 33, the upper end of said shaft having a bearing in an arm 41 of the fixed frame 30, and the lower end being stepped in a fixed frame 34. At the upper end of the vertical shaft 33 is a worm 35, which meshes with a worm-wheel 36, (see Fig. 1,) mounted on the cam-shaft 25. Through this last-described train of gearing the cams 26 26 will be rotated when the machine is operated.

The operation of the mechanism so far described is as follows: Power being applied to the shaft 3, the rotary motion thereof is communicated, through the gears 5, 7, and 8, to the single-toothed pinion 10, and by the latter an intermittent rotary motion is imparted to the rack-disk 13 and a corresponding movement to the picture-disk 2. As the perforations or recesses in the disk 13 correspond in arrangement, position, and number to the pictures on the disk 2, it is obvious that each engagement of a tooth on the wheel 14 with a perforation or recess in the disk 13 will impart an intermittent rotary movement to said disk and will bring a picture on the disk 2 into and allow the same to remain in the illuminated field for an interval of time, the interval of exposure necessarily being greater than the time required to effect the change from one picture to another, owing to the employment of the described stop-motion 10 12. Simultaneous with the intermittent rotary motion the swinging frame is moved, and in consequence the picture-disk is advanced laterally across the optical axis of the lens in the lantern 1 through the actions of the cams 26 26 on the rollers 20. This lateral movement is uninterrupted and at a uniformly-varying speed, either accelerated, if the exposure begins at the outer convolution, or retarded, if the exposure begins with the inner convolution. In the position shown in the drawings the exposure is begun with the pictures on the outer convolution of the spiral, (although the pictures could be arranged beginning at the center,) so that for every unit of angular advance of the cams 26 the disk 2 is advanced a unit of lateral movement. The contiguous convolutions of the spiral are placed as near as possible to each other to save space, and the cams 26 are so constructed that for each complete rotation of the disk 2 said disk will be advanced laterally a distance equal to the diameter of one picture or the distance between contiguous convolutions of the spiral. For example, if the pictures are one-quarter of an inch in diameter the cams 26 will advance the disk 2 that distance for each convolution of the spiral or for each complete rotation of the said disk. Also when beginning at the outer end of the spiral every unit of advance along the spiral—that is, from the center of one picture to the center of the next succeeding picture—involves a varying angular speed of the disk 2, due to the approach of the spiral toward its center. In the present case the angular speed is uniformly accelerated, owing to the use of the described stop-motion; but the time of exposure remains constant.

It is well known that the present class of apparatus takes advantage of the fact that the eye is unable to perceive a movement exceeding a certain velocity and of the persistence of vision. As the time of exposure is comparatively greatly in excess of the time required to change from one picture to the next succeeding and the varying angular speed and the amount of lateral movement for each picture so infinitesimal that the change is imperceptible, the image is readily retained.

When a series of pictures has been exhibited and the end of the spiral reached, the disk 2 will have been advanced until the last picture is in line with the optical axis of the lantern-lens and the swinging frame will have reached the limit of its movement. The return movement is effected as follows: By depressing the lever 42 the entire swinging frame carrying the picture-disk, cams 26 26, &c., will be moved forward or in the direction of the screen. The effect of this is to release the disk 13 from engagement with its driving-wheel 14 and to release the worm-wheel 36 from engagement with the worm 35. This permits the spring 27 to rotate the shaft 25, thereby returning the cams 26 to their initial position and also permitting the frame to be swung on its pivotal supports to restore the picture-disk 2 and its rack-disk 13 to the starting position.

Any suitable means may be employed to secure the picture-disk on the shaft 15 and to permit the ready removal of one disk and its replacement by another.

Inasmuch as the present apparatus is designed for use with a photographic picture-disk having the ground black or opaque and as the period of change from one picture to the next on the disk is so infinitesimal as not to be perceived by the eye, there will be no necessity for the use of a shutter. If, however, this is found necessary, any of the well-known forms of shutters could be used.

I have so far described my invention as applied to a single projecting instrument; but, as shown in the drawings, I contemplate employing the described mechanism in duplex form, as many advantages are secured thereby. So far as known to me a kinematograph of the "film" type is capable of from ten to twelve exposures per second only; but by grouping the pictures on two disks and exposing them alternately—that is, beginning with the first picture on the first disk, then the first on the second disk, which is a step in advance of the first picture on the first disk, then the second on the first disk, then the second on the second disk, and so on—not only may a large number of pictures be grouped into a small compass, but the number of pictures exposed per second may be increased to about sixteen, and by shifting from one disk to the other each disk will have to be moved but eight times per second to obtain the same effect if one disk were moved sixteen times per second. This will result also in giving a clearer projection on the screen. In carrying out this part of my invention I construct a mechanism similar in all its parts to that previously described, the corresponding parts being indicated by corresponding numerals primed, and mount the whole in a suitable frame so that the illuminated field of lantern 1' will be superimposed upon that of lantern 1. As shown in the drawings, the constant-progression cams 26' 26' derive their motion through the shaft 33 common to both sets of mechanisms. The intermittent rotary movement of the disk 2' corresponds in character and extent to that of the disk 13' just as disk 2 corresponds to that of disk 13 in this respect and also in having its axis advanced toward the optical axis by the constant-progression cams. In order, however, to properly time the exposures on the two picture-disks the one-toothed pinions 10 and 10' are set one half-rotation apart—that is, while the wheel 14 is being moved by the pinion 10 to rotate picture-disk 2 the wheel 14' will be locked by the pinion 10', so that a picture on disk 2' will be exposed. The relation of the tooth 39' on the pinion 10' to the tooth 39 on pinion 10 is indicated in Fig. 6. It is obvious from this relation of the pinions 10 and 10' that if we begin with the first picture on disk 2 it will be immediately succeeded by the first picture on disk 2', that by the second picture on disk 2, the latter by the second picture on disk 2', and so on, it being understood that the successive pictures exposed are successive views of the object photographed. In other respects the mode of operation of the complemental mechanism is precisely like that first described.

If the picture should be arranged on the disk 2 beginning at the center of the spiral, it is obvious that the angular speed of rotation would be uniformly decreased in traveling to the outermost convolution and that the axis of said disk would be moved away from the optical axis at a uniformly-retarded rate of speed. Such changes in the described mechanism to meet this condition are obvious.

While I have described my invention in connection with an apparatus for projecting a picture upon a screen, it is to be understood that the mechanism may be mounted in a suitable casing so that the pictures fixed upon the disk 2 may be viewed directly by the eye, as in well-known types of mechanism of this class. Neither do I wish to confine myself to the precise details of construction shown and described, as they may be varied without departing from the principle of the invention.

The disk 13, as described, having perforations or notches, is, in effect, a rack-disk, and it is obvious that a continuous rack having teeth to coöperate with a proper gear-wheel or pinion is within the purview of the invention.

In order to return the frame to its initial position, as above referred to, the upwardly-bent arm 44 of the lever 42 bears against the fixed collar 23 to release the disk 13 from engagement with the toothed wheel 14. In the duplex form of the invention a link 45 connects the lever 42 with a rod 46, and the latter through a pivoted link 45' is connected to an arm 44', which bears against a collar 23', fixed on the shaft 22'. The movement of the lever 42 serves, therefore, to release both disks 13 and 13' simultaneously from engagement with their respective driving-wheels.

What I claim, and desire to secure by Letters Patent, is—

1. In a kinematograph or similar apparatus the combination of a disk having pictures arranged thereon in a spiral path, means to intermittently rotate said disk at a uniformly-varying rate of speed, and means to continuously advance the axis of said disk toward or away from the optical axis.

2. In a kinematograph or similar apparatus the combination of a disk having pictures arranged thereon in a spiral path, means to intermittently rotate said disk, and means to continuously advance the axis of said disk toward or away from the optical axis at a uniformly-varying rate of speed.

3. In a kinematograph or similar apparatus the combination of a disk having pictures arranged thereon in a spiral path, means to intermittently rotate said disk at a uniformly-varying rate of speed, and means to continuously advance the axis of said disk toward or away from the optical axis at a uniformly-varying rate of speed.

4. In a kinematograph or similar apparatus the combination of a disk having pictures arranged thereon in a spiral path, means to intermittently rotate said disk at a uniformly-varying rate of speed, and independently-operated means to continuously advance the axis of said disk laterally toward or away from the optical axis.

5. In a kinematograph or similar apparatus the combination of a disk having pictures arranged thereon in a spiral path, of means for intermittently rotating said disk at a uniformly-varying angular speed while maintaining a constant period of exposure, and means for continuously advancing the axis of said disk toward or away from the optical axis at a uniformly-varying rate of speed.

6. In a kinematograph or similar apparatus the combination of a disk having pictures arranged thereon in a spiral path, means to intermittently rotate said disk at a uniformly-varying rate of speed, a cam adapted to advance the axis of said disk toward or away from the optical axis at a continuous uniformly-varying rate of speed, and means to continuously rotate said cam.

7. In a kinematograph or similar apparatus the combination of a disk having pictures arranged thereon in a spiral path, a rack-disk mounted on the same shaft as said picture-disk, the teeth on said rack-disk being arranged in a spiral path similar to, and corresponding in position and number to the pictures on the picture-disk, a toothed wheel engaging said rack-disk and means for intermittently rotating said toothed wheel.

8. In a kinematograph or similar apparatus the combination of a disk having pictures arranged thereon in a spiral path, a wheel adapted to intermittently rotate said disk at a uniformly-varying rate of speed, a cam adapted to continuously advance said disk toward or away from the optical axis, a power-shaft, and independent means connecting said shaft to said wheel and cam respectively to produce the stated movements of the picture-disk.

9. In a kinematograph or similar apparatus the combination with a pivotally-supported frame, of a disk carried by said frame said disk having pictures arranged thereon in a spiral path, means to intermittently rotate said disk, and means to simultaneously move said frame on its pivotal support to carry said disk across the optical axis.

10. In a kinematograph or similar apparatus the combination with a pivotally-supported frame, of a disk carried by said frame said disk having pictures arranged thereon in a spiral path, means to intermittently rotate said disk, a cam bearing against said frame and adapted to move it on its pivotal support at a continuous but uniformly-varying rate of speed, and means to continuously rotate said cam.

11. In a kinematograph or similar apparatus the combination with a pivotally-supported frame, of a shaft supported by said frame, a disk having pictures arranged thereon in a spiral path and supported on said shaft, a rack-disk also supported on said shaft, means to continuously move said frame on its pivotal support so as to carry the picture-disk across the optical axis at a uniformly-varying rate of speed, and means to intermittently rotate said rack-disk while said frame is being moved.

12. In a kinematograph or similar apparatus the combination with a pivotally-supported frame, of a shaft supported by said frame, a disk having pictures arranged thereon in a spiral path and supported on said shaft, a rack-disk also supported on said shaft, means to continuously move said frame on its pivotal support so as to carry the picture-disk across the optical axis at a uniformly-varying rate of speed, means to intermittently rotate said rack-disk while said frame is being moved, and means to release said rack-disk from its driving means to permit the parts to be restored to their initial positions.

13. In a kinematograph or similar apparatus the combination of a disk having pictures arranged thereon in a spiral path, a rack-disk having teeth thereon arranged in a similar spiral path, a shaft on which both said disks are mounted, a shaft extending parallel with the plane of said rack-disk and across the axis thereof, a toothed wheel mounted on said last-named shaft in line with the optical axis and engaging said rack-disk, and means to intermittently rotate said wheel.

14. In a kinematograph or similar apparatus the combination with a frame, of a shaft supported therein, arms engaging said shaft, pivotal supports for said arms, a picture-disk carried by said shaft, cams adapted to bear against said arms, a power-shaft and means actuated thereby to impart a continuous rotary movement to said cams to thereby rock said frame to advance the picture-disk toward or away from the optical axis.

15. In a kinematograph or similar apparatus the combination with a pivotally-supported frame, of a shaft carried by said frame, a disk on said shaft having the pictures arranged thereon in a spiral path, a second disk on said shaft having a rack thereon also arranged in a spiral path, a toothed wheel engaging said rack, a power-shaft, a train of gears connected to said shaft adapted to intermittently rotate said toothed wheel, said train comprising a single-tooth driving-wheel meshing with a notched driven wheel, said driven wheel being mounted on the shaft of said rack-engaging wheel.

16. In a kinematograph or similar apparatus the combination of two disks both having pictures arranged thereon in a spiral path, the two sets of pictures constituting a single group with successive pictures alternating on the disks, means for exhibiting a picture first on one disk and then on the other so as to successively present to view the pictures of a group, and means to intermittently rotate said disks at a uniformly-varying rate of speed, and means to continuously advance the axes of said disk toward or away from the optical axes.

17. In a kinematograph or similar apparatus the combination of two disks both having pictures arranged thereon in a spiral path, the two sets of pictures constituting a single group with successive pictures alternating on the disks, means for intermittently rotating said disks alternately, said means comprising independent trains of gears connected to the power-shaft said trains including single-toothed driving-wheels set diametrically opposite.

18. In a kinematograph or similar apparatus the combination of two disks both having pictures arranged thereon in a spiral path, the two sets of pictures constituting a single group the successive pictures alternating on the disks, means for intermittently rotating said disks alternately at a uniformly-varying rate of speed, and means to continuously advance the axes of said disks toward or away from the optical axis at a uniformly-varying rate of speed.

19. In a kinematograph or similar apparatus the combination of two disks having pictures arranged thereon in a spiral path, the two sets of pictures constituting a single group with successive pictures alternating on the disks, independent pivotally-supported frames on which said disks are mounted, a power-shaft, independently-operated means connected to said shaft for intermittently rotating said disks alternately at a uniformly-varying rate of speed, independent sets of cams bearing against said frames and adapted to advance said disks toward or away from the optical axis at a uniformly-varying rate of speed, and means actuated by said power-shaft to continuously rotate said cams.

20. A kinematograph or similar apparatus comprising two projecting lanterns, means to support picture-disks in proper relation to said lanterns, said disks having pictures arranged thereon in a spiral path the two sets of pictures constituting a single group with successive pictures alternating on the disks, independent cams adapted to advance said disks continuously at a uniformly-varying rate of speed toward or away from the optical axis, worm-gearing and means actuating the same to impart a continuous simultaneous rotary movement to said cams, and means to intermittently rotate said disks alternately at a uniform varying rate of speed.

In testimony whereof I have hereunto signed my name in the presence of two subscribing witnesses.

WILLIAM H. BAKER.

Witnesses:
H. P. SHOOBRIDGE,
JOHN A. MIDDLETON.